Oct. 3, 1944.  E. C. WALSH  2,359,596

STOKER TIMER

Filed Dec. 3, 1941

INVENTOR.
Edward C. Walsh
BY George H. Fisher
Attorney

Patented Oct. 3, 1944

2,359,596

UNITED STATES PATENT OFFICE 2,359,596

STOKER TIMER

Edward C. Walsh, Minneapolis, Minn., assignor to Minneapolis-Honeywell Regulator Company, Minneapolis, Minn., a corporation of Delaware Application December 3, 1941, Serial No. 421,458

7 Claims. (Cl. 236—46)

This invention is concerned with an improved temperature and time operated control device for controlling fuel feeding devices, especially automatic coal stokers.

The primary object of the invention is to provide a simple and inexpensive timing mechanism for controlling a fuel feeding device which is normally controlled by a thermostat wherein the timing mechanism intermittently operates the fuel feeding device, both when heating is required and when it is not required.

Another object is to provide a thermostat and time operated control arrangement for controlling the fuel feeding device wherein the device is intermittently operated according to one schedule when the thermostat is calling for heat and according to another schedule when it is not.

Another object is to provide a time operated cam mechanism having a plurality of cam surfaces or tracks wherein control is automatically shifted from one track to the other.

Another object is to provide a time operated device for controlling a fuel feeding device in combination with a thermostat, the time operated device comprising a cam and switches associated therewith which are closed in sequence by cam follower means associated with the cam, one switch controlling the fuel feeding device when the thermostat is calling for heat and the other switch controlling the stoker when it is not.

Another object is to provide a time operated switching arrangement comprising means forming a plurality of cam surfaces or tracks with a cam follower for each track and a thermostat for rendering either one cam follower or the other effective to operate a switch.

Another object is to provide a control arrangement for a fuel feeding device comprising a thermostat and a timing mechanism capable of operating the device according to a plurality of different schedules with manual selector means at the thermostat for changing from one schedule to another.

Figure 1:
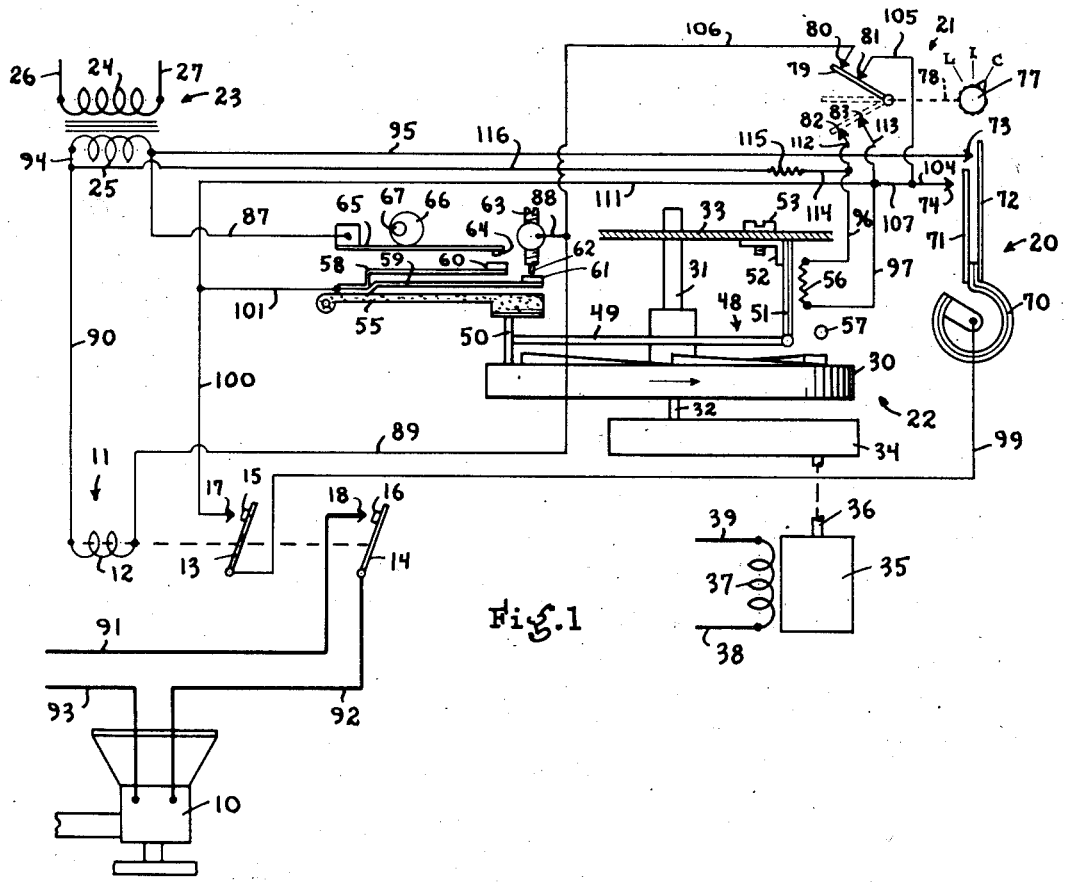
Figure 2:
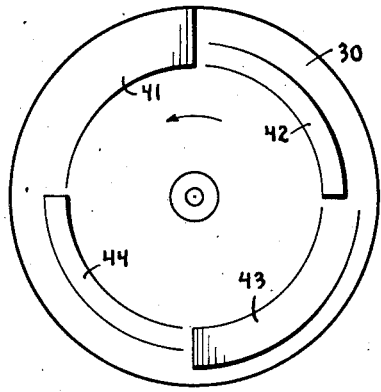
Figure 3:
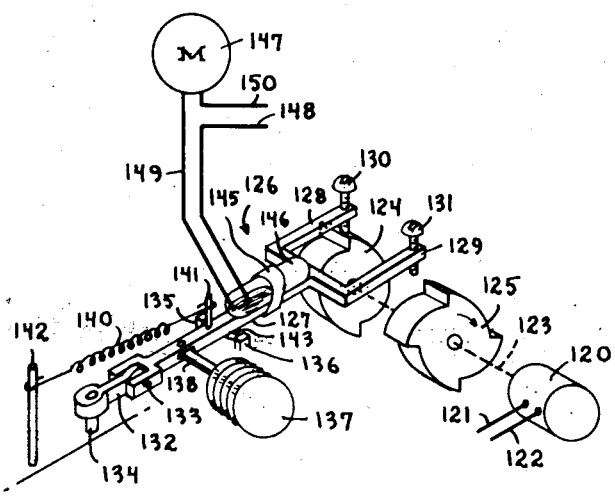

Numerous other objects and advantages of my invention will become apparent from the following detailed description and drawing wherein:

Figure 1 represents diagrammatically a stoker control system embodying a preferred form of my invention, Figure 2 is a detail of Figure 1, and Figure 3 is a diagrammatic representation of a modified form of my invention.

Referring to Figure 1 of the drawing, numeral 10 designates a fuel feeding device which in this instance is an automatic stoker and which is controlled by my improved control arrangement. The controls for the stoker include a relay designated by the numeral 11, the relay comprising a winding 12 having an armature associated therewith attached to movable switch blades 13 and 14 carrying electrical contacts 15 and 16, respectively. When the winding 12 is energized, the blades 13 and 14 are moved to the left moving contacts 15 and 16 into engagement with fixed electrical contacts 17 and 18, respectively. The controls for the stoker also include a thermostat 20 responsive to the temperature of the space being heated by the plant to which fuel is fed by the stoker 10, and a manual selector switch 21 and the timing mechanism designated generally at 22.

Power for operation of the relay 11 in response to the various control devices is supplied by a stepdown transformer 23 having a primary winding 24 and a secondary winding 25, the primary winding having a greater number of turns than the secondary. Power is supplied to the primary winding by line conductors 26 and 27 connected to any suitable source of power not shown.

The timing mechanism 22 drives a cam 30 which has shaft portions 31 and 32, the shaft portion 31 being journalled in a panel 33 and the shaft portion 32 being driven through a gear train 34 by means of an electric timing motor 35, the timing motor 35 being connected to the gear train by a shaft 36. The timing motor 35 may be of any well known commercial type, this motor including a winding 37 supplied with power through line conductors 38 and 39 which may be connected to any suitable source of power, not shown.

The cam 30 has dwells on its upper face, as may best be seen on the plan view of the cam shown in Figure 2. The cam has four dwells designated 41, 42, 43 and 44. The dwells gradually rise from the flat surface of the cam, each having an abrupt dropoff, the dwells being equally spaced angularly, and being circularly arranged adjacent the edges of the cam. The dwell 41 has a greater radial extent than the other dwells and the dwell 43 has a greater radial extent than the dwells 42 and 44, there being a space between the dwells 42, 43, 44 and the edge of the cam.

Numeral 48 designates generally a cam follower assembly comprising an arm 49 at the left end of which is carried a cam follower member 50 made of flexible material, and arranged substantially at right angles to the arm 49. The right end of the arm 49 is pivotally attached to the lower end of a bimetal element 51 and the upper end of this element is secured to a bracket 52 which is adjustably attached to the panel 33 by a screw 53. The lower edge of the cam follower member 50 rides on the cam 30 and the upper edge of this member engages one end of a pivoted member 55 which is made of Bakelite or other insulative material. The screw 53 extends through a slot in the panel 33 and by adjusting this screw to the right or left, the entire cam follower assembly 48 is moved to the right or left so that the cam follower member 50 is moved toward or away from the center of the cam 30. Inasmuch as member 50 is flexible it forms a strain release, so that the binding effect is relieved if member 50 engages the side of one of the cam dwells when being moved toward the center of the cam. Thus member 50 can be moved toward the center of the cam no matter what its position is with respect to the dwells. The screw 53 normally is adjusted to one of three positions. When it is in its position farthest to the left, the cam follower assembly 48 is in a corresponding position and in this position the cam follower member 50 rides on the cam 30 at a radius very near the edge of the cam so that the cam follower member 50 will be lifted only by the dwell 41 and will miss the other three dwells, the cam being rotated by the timer motor in a direction shown by the arrow. When the screw 53 is moved to its position farthest to the right, the cam follower assembly 48 is in a corresponding position and in this position the cam follower member 50 rides on the cam 30 at a radius nearer the center of the cam so that the cam follower member 50 will now be lifted by all four of the dwells as the cam rotates. When the screw 53 and the cam follower assembly 48 are in an intermediate position, the cam follower 50 rides on the cam at a radius intermediate its two other positions, and in this position of the cam follower it is lifted by the dwells 41 and 43 but it misses the dwells 42 and 44 as the cam rotates. From the foregoing, it is to be seen that by moving the cam follower, the cam follower member can be so adjusted that three dwells or two dwells of the cam can be rendered ineffective. When the cam follower assembly is moved to the right or left, the cam follower member 50 continues to engage the end of the pivoted lever member 55.

Adjacent the bimetal element 51 is an electrical heating resistance element 56. When this element is electrically energized, it heats the bimetal element 51 and the element 51 warps to the right until it engages a stop 57, the warping of the element moving the arm 49 and cam follower member 50 to the same position that it is in when the screw 53 is adjusted to its position farthest to the right. Thus when the heating element 56 is energized, the cam follower member 50 will be lifted by all four of the dwells on the cam 30. As will presently be pointed out, the heating element 56 can be automatically energized in response to the thermostat 20.

Referring again to the pivoted lever member 55, attached to this member are two contact brackets 58 and 59, the bracket 58 carrying a contact 60 and the bracket 59 carrying a contact 61. The contact 61 cooperates with a contact 62 on the end of an adjustable contact screw 63. The contact 60 cooperates with a contact 64 on the end of a contact bracket 65. The contact bracket 65 is flexible and it normally engages an eccentric 66 mounted on a shaft 67 which can be manually adjusted so that the eccentric will adjust the position of bracket 65 and contact 64 relative to contact 60. As pointed out, the contact screw 63 is also adjustable.

As the cam 30 rotates, the cam follower 50 will be lifted by one or more of the dwells on the cam and the cam follower member will in turn gradually move the member 55 in a counter-clockwise direction about its pivot. As the cam follower member 50 is lifted, at a predetermined point on the dwells depending on the adjustment of screw 63, the contact 61 will be brought into engagement with contact 62. As the cam continues to rotate at another predetermined point on the dwells depending upon the adjustment of eccentric 66, contact 60 will be brought into engagement with contact 64, the bracket 59 flexing as the cam continues to rotate. As will be presently pointed out, the relay 11 is controlled by the contacting mechanism operated by the timing mechanism.

The thermostat 20 comprises a bimetal element 70 attached to switch blades 71 and 72 which are movable to the right and left as the temperature affecting the element 70 rises and falls, respectively. When the temperature falls to a value of 72°, for example, the blade 72 engages a fixed electrical contact 73, and when the temperature has fallen another 2° to 70°, for example, the blade 71 engages a fixed contact 74. When the temperature rises, the blades 71 and 72 disengage from their respective contacts in reverse order, that is, the blade 71 disengaging from contact 74 when the temperature rises above 70° and the blade 72 disengaging from contact 73 when the temperature rises above 72°.

The manual selector switch 21 is located preferably adjacent the thermostat and may be within the casing of the thermostat, it being understood that as manufactured the thermostat is usually within a suitable casing. The manual selector switch 21 comprises a manually adjustable button 77 mounted on the end of a shaft 78. Also mounted on the shaft is a switch blade 79. The button 77 and blade 79 have three positions designated by the graduations adjacent the button 77, the graduations being marked L, I and C standing for low, intermediate, and continuous. The significance of these markings will presently be pointed out. When the button 77, which has a small pointer as shown, is opposite the graduation marked C, the blade 79 engages and bridges two fixed electrical contacts 80 and 81. When the button 77 is adjusted to a position wherein the pointer is opposite the graduation marked L, the blade 79 engages and bridges two fixed electrical contacts 82 and 83. When the button 77 is in an intermediate position with its pointer opposite the graduation marked I, the blade 79 is in an intermediate position not engaging any of the electrical contacts associated therewith.

Referring to the operation of the complete system it is to be understood that the timing mechanism can intermittently operate the stoker when there are no demands for heat from the thermostat for purposes of maintaining a fire. The stoker can be operated in response to the thermostat either continuously or at one or the other of two different intermittent feeding rates depending upon the setting of the manual selector switch 21.

The fire maintaining operation will be described first. It will be assumed that the screw 53 and the cam follower assembly 48 are in their intermediate positions wherein the cam follower 50 rides on the dwells 41 and 43 but misses the dwells 42 and 44. The cam 30 is continuously operated at a constant rate of speed which may be one revolution per hour, for example. Thus, the angular extent of each one of the dwells on the cam corresponds to very nearly fifteen minutes of time of operation. Assuming now that the cam follower member 50 is being lifted by one of the dwells as previously pointed out, the contacts 61 and 62 will first be brought into engagement at a predetermined point on the dwell depending upon the setting of contact screw 63. As long as the thermostat is not demanding heat, closure of these contacts will have no effect on the relay. As the cam continues to rotate and as pointed out above, at another predetermined point on the dwell, contacts 60 and 64 will be brought into engagement. When these contacts are brought into engagement a circuit is completed for the relay winding 12 as follows: from secondary 25, through wire 87, bracket 65, contacts 64 and 60, bracket 58, bracket 59, contacts 61 and 62, contact screw 63, wire 88, wire 89, winding 12, and wire 90 back to secondary 25. Completion of this circuit energizes the relay 11 moving blades 13 and 14 to the left, bringing their respective contacts into engagement with the fixed contacts 17 and 18. Engagement of contacts 16 and 18 completes the circuit for the motor of the automatic stoker 10 as follows: from wire 91 to contacts 18 and 16, blade 14, wire 92, the motor of the stoker back to wire 93, the wires 91 and 93 being connected to any suitable source of power, not shown. The stoker will now remain in operation until the cam follower member 50 drops off the dropoff of the dwell by which it was lifted. When this occurs the contacts 61 and 62 will be separated and the contacts 60 and 64 will be separated, separation of the contacts interrupting the circuit of winding 12 and deenergizing the relay 11. Thus, as long as there are no demands for heat from the thermostat the stoker will be operated intermittently twice per revolution of the cam 30 as long as the screw 53 is in its intermediate position as assumed above, the duration of the operating periods of the stoker depending upon the adjustment of bracket 65.

By adjusting the screw 53 to the right or left, the fire maintaining schedule can be adjusted as described above. That is, when the screw 53 is moved to its extreme leftward position there will be one operation of the stoker per hour, and when the screw 53 is moved to its position farthest to the right there will be four operations per hour. The duration of the periods on any schedule may be adjusted by the eccentric 66.

The operation described above was fire maintaining operation which takes place when there are no demands for heat from the thermostat, the operation described in the foregoing not contemplating that either blade of the thermostat engaged its respective contact. The operation of the system will now be described in response to the thermostat 20; the operation will first be described with the manual selector switch 21 in the position shown in Figure 1 wherein the pointer of button 77 is opposite the graduation marked C.

Before proceeding with the description of the operation in response to the thermostat 20, the purpose of the selector switch 21 will be explained so that as the ensuing description proceeds it may be better understood.

In automatic stoker fired heating installations controlled by a thermostat, overshooting of the controlled temperature is often experienced due to the fact that while the thermostat is demanding heat, if the stoker is continuously operated, a large amount of fuel may be piled up in the combustion chamber which continues to burn after the stoker is stopped and the thermostat is satisfied and which causes the temperature to overshoot; that is, to rise considerably above a desired value. This is perhaps more apt to occur in mild weather. I have provided the manual selector switch 21 in order to more successfully cope with this condition. It will be understood that, referring to the manual selector switch, the C. stands for "continuous," meaning that when the manual selector switch is in this position the stoker will be operated continuously as long as the thermostat demands heat. If the operator finds that overshooting occurs when the manual selector switch is set in this position for continuous operation, he may turn it to the left so that the pointer on the button 77 is opposite the graduation marked I for "intermediate." With the manual selector switch so positioned, the blade 79 is in its intermediate position not bridging either the contacts 80 and 81 or the contacts 82 and 83. When the manual selector switch is in this position, when there is a demand for heat from the thermostat, the firing will be intermittent rather than continuous. Thus, after each firing period the thermostat will have a chance to become satisfied. As a result of this the chances of overshooting will be greatly reduced. If the operator finds that overshooting occurs even with the manual selector switch 21 in its intermediate position, he may turn it to the left to a position wherein the pointer on button 77 is opposite the graduation marked L, for "low." When the manual selector switch is in this position, the switch blade 79 engages and bridges the contacts 82 and 83 and in this position of the manual selector switch the firing in response to thermostatic demands is intermittent, the periods being less frequent than when the manual selector switch is in its intermediate position. The detailed operation with the manual selector switch in its various positions will now be pointed out.

With the manual selector switch set for continuous operation when there is a demand for heat; that is, when blades 72 and 71 of the thermostat engage their respective contacts, the temperature having fallen to 70°, the relay winding 12 will be energized through the following circuit: from secondary 25 through wire 95, contact 73, blade 72, element 70, blade 71, contact 74, wire 104, wire 105, contact 81, blade 79, contact 80, wire 106, wire 89, winding 12, wire 90 and wire 94 back to secondary 25. Completion of this circuit will energize the relay 11, moving the switch blades 13 and 14 to the left, and engagement of contacts 15 and 17 will now complete a maintaining circuit for the relay as follows: from secondary 25, through wire 95, contact 73, blade 72, element 70, wire 99, blade 13, contacts 15 and 17, wire 100, wire 111, wire 107, wire 105, contact 81, blade 79, contact 80, wire 106, wire 89, winding 12, wire 90 and wire 94, back to secondary 25. Energization of the relay 11 will cause operation of the stoker as before, the circuit being as described above. From the foregoing circuits it can be seen that as long as the thermostat continues to call for heat, relay 11 will remain continuously energized and the stoker will continue to operate, original energization having been independent of the contacts of the timing mechanism and the relay remaining energized until blade 72 disengages from contact 73 whenever the temperature rises above 72°.

With the operation just described above, the heating element 56 is energized so as to cause the cam follower member 50 to be moved to its innermost position wherein it rides on all four of the cam dwells but this makes no difference at this time inasmuch as the relay 11 is kept continuously energized as long as the thermostat demands heat. The circuits whereby the heating element 56 is energized will be traced presently.

Thus with the manual selector switch in the position shown in Figure 1, the operation in response to the thermostat is to start the stoker at a temperature of 70° and to keep it continuously in operation until the temperature rises to 72°.

With the manual selector switch in the position of Figure 1, in addition to the normal thermostatic demands for heat as just described above, the relay may be energized by the contacts 60 and 64 when only the blade 72 of the thermostat has engaged its contact and the relay will then remain energized keeping the stoker in continuous operation until blade 72 disengages from contact 73. Thus if the relay is energized by means of contacts 60 and 64, the circuit being as traced above, when blade 72 of the thermostat is engaging contact 73, the manual selector switch being in the position of Figure 1, a maintaining circuit for the relay is completed as follows: from secondary 25 through wire 95, contact 73, blade 72, element 70, wire 99, blade 13, contacts 15 and 17, wire 100, wire 111, wire 107, wire 105, contact 81, blade 79, contact 80, wire 106, wire 89, winding 12, wire 90, and wire 94 back to secondary 25. This maintaining circuit will keep the relay energized and the stoker in operation until the temperature rises to 72° causing blade 72 to disengage from contact 73.

Thus with the manual selector switch in the position of Figure 1, whenever the contacts 60 and 64 energize the relay for fire maintaining operation of the stoker, if the thermostatic blade 72 is engaging contact 73, the stoker will be kept continuously in operation until blade 72 disengages from contact 73. In many installations energization of the relay and starting of the stoker in this manner will cause the temperature to be maintained at the desired value without the blade 71 engaging its associated contact. Of course under heavy heating load conditions or as a result of a sudden drop in outdoor temperature, blade 71 may engage contact 74 when contacts 61 and 62 are not in engagement and thus the relay will be energized and the stoker started irrespective of the timing contacts. This operation has already been described above.

From the foregoing it is to be seen that with the manual selector switch in the position of Figure 1 there are two types of operation in response to the thermostat. If, with the manual selector switch in the position of Figure 1, the operator finds that overshooting occurs he may turn the button 77 to the left to a position wherein the pointer is opposite the graduation marked I, and the blade 79 is in a position intermediate its two pairs of associated contacts. As will now appear, the relay cannot now be energized in response to the thermostat until the timer has closed contacts 61 and 62. With the manual selector switch thus set for intermittent operation, that is, intermediate firing, the thermostatic circuit for energizing the relay 11 is as follows: from secondary 25 to wire 95, contact 73, blade 72, element 70, blade 71, contact 74, wire 104, wire 107, wire 111, wire 101, bracket 59, contacts 61 and 62, contact screw 63, wire 88, wire 89, winding 12, wire 90, and wire 94 back to secondary 25. Thus with the manual selector switch set for intermediate operation the relay will be energized when both thermostatic blades are engaging their respective contacts, and contacts 61 and 62 are in engagement, and these latter contacts will engage when the cam follower member 50 is at a point on one of the cam dwells determined by the setting of contact screw 63. When the relay is thus energized a maintaining circuit is now completed as follows: from secondary 25, through wire 95, contact 73, blade 72, element 70, wire 99, blade 13, contacts 15 and 17, wire 100, wire 101, bracket 59, contacts 61 and 62, contact screw 63, wire 88, wire 89, winding 12, wire 90, and wire 94 back to secondary 25. The relay will be kept energized and the stoker will be kept in operation by reason of this maintaining circuit until contacts 62 and 61 are separated or until blade 72 disengages from contact 73. It is to be seen therefore that with the type of operation being described, if blade 71 stays in engagement with contact 74, the relay will be deenergized by opening of contacts 61 and 62; that is, the operation will be intermittent and the length of the energized periods of the relay, that is, the operating periods of the stoker, will depend upon the adjustment of contact screw 63, the contacts 61 and 62 of course opening when the cam follower member 50 drops off a cam dwell. It is to be seen also that with this type of operation that even though the blade 71 disengages from contact 64, the relay will be kept energized through the maintaining circuit until contacts 61 and 62 are separated.

In addition to the relay circuits described, when both the thermostatic blades engage their respective contacts the heating element 56 is energized through the following circuit: from secondary 25 through wire 95, contact 73, blade 72, element 70, blade 71, contact 74, wire 104, wire 107, wire 97, element 56, wire 96, wire 114, resistance element 115, wire 116, and wire 94 back to secondary 25. This circuit for the heating element 56 extends through contact 74 and blade 71 of the thermostat 20. As soon as the relay 11 is energized, another circuit for heating element 56 is completed as follows: from secondary 25, through wire 95, contact 73, blade 72, element 70, wire 99, blade 13, contacts 15 and 17, wire 100, wire 111, wire 97, element 56, wire 96, wire 114, resistance 115, wire 116, and wire 94 back to secondary 25. Energization of the heating element 56 will move the cam follower member 50 to its innermost position in the manner already described by reason of warping of the bimetal element 51. Thus, the cam follower member will be in its position for producing four intermittent firing operations per hour, and by reason of the last described circuit for heating element 56 it will be kept in this position after blade 71 disengages from the contact 74 and until the relay is deenergized. As long as the blade 71 stays in engagement with contact 74, the relay will be intermittently energized and the stoker intermittently operated four times per hour, the length of periods of course depending upon the adjustment of screw 63.

After blade 71 is disengaged from contact 74 and the relay has been deenergized, either by opening of contacts 61 and 62 or disengagement of blade 72 from contact 73, element 56 will be deenergized and bimetal element 51 will assume its cold position wherein cam follower member 50 is in its intermediate position as shown on Figure 1, it being remembered that screw 53 was set in its intermediate position wherein the timing mechanism actuates its contacts twice per hour.

If desired, the bimetal element 51 may be so constructed that it cools relatively slowly and thus after the heating element 56 has been deenergized the cam follower member 50 will remain at its innermost position for a period of time which might be five or more minutes, for example. Thus if blade 71 engaged contact 74 relatively soon after deenergization of the relay, opportunity would be provided for the relay to be energized again sooner than if the cam follower member 50 were permitted to move outward to its intermediate position immediately; that is, slow cooling of the element 51 after deenergization of heating element 56 would give the dwells 42 and 44 of the cam 30 opportunity to close the contacts 61 and 62 and to reenergize the relay in the event blade 71 should reengage the contact 74.

From the foregoing it will be seen that with the manual selector switch in its intermediate position the thermostat and timing mechanism may produce intermittent firing operation at the rate of four periods per hour while blade 71 engages contact 74. After blade 71 disengages from contact 74 the operation is interrupted either when contacts 61 and 62 separate or when blade 72 of the thermostat disengages from contact 73.

If the operator finds that even when the manual selector switch is set for intermediate operation that the temperature still overshoots the desired value, he may set the manual selector switch to its third position wherein the button 77 has its pointer adjacent the graduation marked L standing for "low." When the manual selector switch is in this position the arm 79 bridges contacts 82 and 83, and as will now be pointed out, these contacts shunt the heating element 56. Now when there is a thermostatic demand for heat, the relay is energized through the same circuit by which it is energized upon a thermostatic demand for heat when the manual selector switch is in its intermediate position. The maintaining circuit is also the same. The operation is similar to that which takes place when the manual selector switch is in its intermediate position except that the heating element 56 is not now affected, it being shunted by means of the following circuit: from heating element 56 through wire 96, to wire 112, contact 82, blade 79, contact 83, wire 113, wire 97 back to heating element 56. Thus similarly to the operation described above, when the manual selector switch is in its intermediate position, now, as long as blade 71 remains in contact with contact 74, the stoker will be intermittently operated at the rate of two periods per hour, the duration of the periods depending upon the adjustment of screw 63. As with the intermediate operation, after blade 71 disengages from contact 74, the relay will remain energized either until contacts 61 and 62 are separated or until blade 72 disengages from contact 73.

During the foregoing description of operation it was assumed that the screw 53 was manually set in its intermediate position for two intermittent fire maintaining operations per hour. If this screw were set in its position farthest to the left for one fire maintaining operation per hour the bimetal element 51 would nevertheless move the cam follower member 50 to its innermost position when the heating element 56 is energized so that this adjustment of the screw 53 would make no difference on the operation resulting from setting the manual selector switch in its C and I positions. However, there would be one stoker operation per hour with switch 21 in its L position. Of course, if the screw 53 is set in its position farthest to the right to produce four fire maintaining positions per hour, the operation when the manual selector 21 switch is in its intermediate position will be the same as when this switch is in its low position; that is, in both positions of the manual selector switch, the intermittent operation will be at the rate of four operations per hour.

From the foregoing it can be seen that with the arrangement I have described the operator can by means of an adjustment at the thermostat set the system to operate according to different firing schedules. Thus if the temperature tends to overshoot the operator can adjust the system to a lower rate of firing. The manual selector switch also provides a very convenient and useful adjustment for varying the operation of the system in accordance with the weather conditions, the rate of firing being increased when the weather is cold and reduced when it is mild.

Those skilled in the art will appreciate that I have provided a novel and advantageous arrangement having a number of desirable features although the mechanism is very compact and uses only simple and inexpensive parts. My arrangement offers a useful way of overcoming the objection of overshooting of temperature in stoker fired systems.

Referring to Figure 3 of the drawing, I have shown a modified form of my invention wherein the thermostat and timing mechanism are combined in a single instrument. In Figure 3, numeral 120 designates an electric timing motor including a gear train, the motor being supplied with power through conductors 121 and 122 which may be connected to any suitable source of power, not shown. The timing motor drives a shaft 123 at a speed of one revolution per hour, for example, and mounted on this shaft are two cams 124 and 125. The cam 124 has two gradually rising dwells with abrupt dropoffs and the cam 125 has four gradually rising dwells with abrupt dropoffs. The cams are rotated in a clockwise direction at a constant speed, the direction being indicated by the arrow on cam 125.

Associated with the cams 124 and 125 is a cam follower assembly, generally designated by the numeral 126, the cam follower assembly comprising an arm 127 having two extending cam follower portions 128 and 129. The portion 128 carries an adjustable cam follower screw 130 adapted to ride on the cam 124 and the portion 129 carries an adjustable cam follower screw 131 adapted to ride on the cam 125 depending upon the adjustment of the cam follower assembly which will presently be described.

The left end of the arm 127 is bifurcated as shown and it is pivoted to a small arm 132 by means of the pivot pin 133. Thus, the arm 127 may be rotated in a vertical plane about the pivot pin 133. The other end of the arm 132 is carried on a fixed pivot 134 so that the cam follower assembly may be rotated in a horizontal plane about the pivot 134. The two pivots for the cam follower assembly therefore form in effect a universal joint.

The cam follower assembly is adustable about the pivot pin 134 between two fixed stops 135 and 136. With the parts in the position shown in Figure 3, the arm 127 is engaging the stop 135, and with the parts in this position the portion 128 of arm 127 is in a position wherein cam follower screw 130 rides on cam 124. Cam follower screw 131 does not engage cam 125 with the parts in the position shown in Figure 3. The cam follower assembly may be rotated from a position wherein the arm 127 engages stop 135 to a position wherein it engages stop 136 by a thermostatic bellows 137 which is expansible and contractible in response to changes in temperature adjacent the bellows, the bellows containing a volatile liquid which vaporizes and produces a pressure in the bellows depending upon the temperature adjacent it. The bellows is connected to the arm 127 by a stem 138. The arm 127 moves between the stops 135 and 136 with a snap action, the cam follower assembly of course pivoting around the pivot 134. To provide the snap action, an overcenter spring 140 is provided, one end of the spring being attached to a pin 141 on the arm 127, and the other end of the spring being attached to a fixed pin 142. As soon as the arm 127 starts moving from either extreme position, the change in effect of spring 140 causes the arm to move with a snap action to the other extreme position. This type of snap action is well known and need not be described in further detail. Extending between the stops 135 and 136 is a member 143 having a small hump intermediate the stops so that when the arm 127 moves between the stops it must ride over this hump which lifts the arm 127 slightly, that is, rotates it slightly about the pivot pin 133 so that as the arm 127 moves between the stops the cam follower screws 130 and 131 are lifted slightly and then dropped down again to a position wherein one or the other of the cam follower screws is riding on its respective cam. It is to be understood, of course, that when the arm 127 of the cam follower assembly is moved against stop 136, the cam follower screw 130 is lifted from cam 124 and the cam follower screw 131 is dropped on to cam 125.

Mounted on the arm 127 by means of a clip 145 is a mercury switch 146 having electrodes at its left end. The mercury switch controls the motor 147 of an automatic stoker or other fuel feeding device through wire 148, the mercury switch, wire 149, the motor 147, and wire 150, the wires 148 and 150 being connected to any suitable source of power, not shown.

With the parts in the position shown the temperature affecting the thermostatic bellows 137 is above the desired predetermined value to be maintained, which may be 72° for example. As previously mentioned, the arm 127 is against the stop 135 and the cam follower screw 130 is riding on the cam 124. As the cams are rotated, the dwells of cam 124 will raise the cam follower assembly by means of the cam follower screw 130. When the screw 130 is at a predetermined point on one of the dwells of cam 124, the cam follower assembly will be lifted into a position, that is, rotated about pin 133 to a position wherein the mercury of mercury switch 146 will move from the right end of the switch to the left end for bridging the contacts and energizing the stoker motor. When the cam follower screw 130 drops off the dropoff of the dwell the cam follower assembly will drop down, that is, will be rotated in a direction so as to cause the mercury in mercury switch 146 to move to the other end of the switch for unbridging the electrodes and interrupting the circuit of the stoker motor. Thus it will be seen that with the parts in the position shown, the mercury switch 146 will be closed twice per cycle, that is, twice per revolution of the cams or twice per hour, and will be closed for a period of time depending upon the adjustment of screw 130 with respect to the portion 128 of the cam follower assembly. The cam 124 provides a firing schedule which will maintain a fire in the heating plant being fired by the stoker.

Should now the temperature in the space being heated, that is, the temperature affecting thermostatic bellows 137 decrease to a predetermined value of 70° for example, the bellows will contract and through the stem 138 will move the cam follower assembly about the pivot pin 134 until the pin 141 is moved past the center line through the pins 141, 134 and 142 and the cam follower assembly will then snap over the hump on member 143 and against the stop 136. Upon this movement of the cam follower assembly, the arm 127, as pointed out above, will be lifted slightly and the cam follower screw 130 will be lifted off the cam 124 while the cam follower screw 131 will be dropped on to the cam 125. The purpose of the member 143 in lifting the arm 127 slightly when the thermostatic bellows shifts the cam follower assembly is to prevent the cam follower screws from binding on the edges of the cams when the cam follower assembly is shifted from one cam to the other. When cam follower screw 131 has been dropped on to cam 125, which cam has four dwells as previously pointed out, the cam follower assembly will be intermittently lifted and dropped four times per cycle, that is, four times per hour so as to cause the stoker motor to be energized by the mercury switch 146 four times per hour, the duration of the closed periods of the switch now depending upon the adjustment of the cam follower screw 131 with respect to portion 129 of the cam follower assembly. Thus when the temperature in the space being heated falls below the desired value the stoker will be intermittently operated a greater number of times per hour or other interval as the case may be, the duration of the operating periods now depending upon the adjustment of a different cam follower screw, namely, the screw 131. When the temperature in the heated space again rises above the desired value, that is, when it rises to 72° for example, the cam follower assembly will be shifted back into the position in which it is shown in Figure 3, wherein the cam follower screw 130 rides on the cam 124.

From the foregoing, it is to be seen that in this embodiment of the invention I have provided an arrangement wherein the mechanism is shifted from one firing schedule to another in response to the thermostat, the same switch at all times controlling the stoker. By reason of the two different cam follower screws the duration of the firing periods on each schedule can be independently adjusted. Of course, additional schedules can be provided for by providing additional cams having different numbers of rises with the mechanism being so arranged that the thermostat can shift the cam follower assembly so as to be actuated by any one of the cams.

In the present embodiment of the invention it is to be seen that means for thermostatic and time control of the stoker may be embodied in a single instrument which provides for intermittent operation of the stoker, both when the thermostat is satisfied and when it is unsatisfied. By shifting the cam follower assembly from one cam to another only a single switch is necessary and by using the two cam follower screws the duration of on periods of the stoker on each schedule can be separately adjusted.

The embodiments of my invention which I have disclosed are representative of its preferred forms and applications. Various modifications and variations may occur to those skilled in the art and therefore my disclosure is to be interpreted in an illustrative rather than a limiting sense. The invention is to be limited only in accordance with the claims appended hereto.

I claim as my invention:

1. In apparatus of the character described, in combination, a fuel feeding device, control apparatus comprising means forming a cam surface, means comprising a cam follower associated with the cam surface, means forming a first switch and a second switch actuatable by the cam follower means, means for moving the cam follower means relatively to the cam surface, the cam surface and cam follower means being so arranged that the switches are intermittently operated, and so that one switch is closed for longer periods than the other, relay means controlling the fuel feeding means, circuit means whereby one switch can energize the relay means, means comprising a thermostat having two pairs of contacts which engage and disengage in sequence in response to changes in temperature, circuit means including both said thermostat contacts and the other of said first mentioned switches for energizing the relay means, means forming a maintaining circuit for the relay extending through the first to close of said thermostat contacts and the other of said first mentioned switches whereby the maintaining circuit is always interrupted when the other of said first mentioned switches opens and the relay means cannot be energized by the thermostat until the other of said switches is closed.

2. In apparatus of the character described, in combination, a fuel feeding device, control apparatus for the device comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, one switch being closed for longer periods than the other and the switches being operated at a different frequency when the cam follower means follows one cam surface than when it follows the other, means forming a condition responsive switch in series with the aforementioned switch which is closed for longer periods, the switches being arranged to cause periodic operation of the fuel feeding device when the condition responsive switch is satisfied and periodic operation of the fuel feeding device for longer periods when the condition responsive switch is unsatisfied.

3. In apparatus of the character described, in combination, a fuel feeding device, control apparatus for the device, comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, the first switch being closed for longer periods than the second and the switches being operated at a different frequency when the cam follower means follows one cam surface than when it follows the other, means forming a condition responsive switch in series with the first switch which is closed for longer periods, means controlled by the condition responsive switch for adjusting the cam follower means from one cam surface to the other for causing the said switch means to be operated at a higher frequency when the condition responsive switch is unsatisfied, and means for operating said fuel feeding device independently of said condition responsive switch, said means including said second switch.

4. In apparatus of the character described, in combination, a fuel feeding device, control apparatus for the device comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, the first switch being closed for longer periods than the second and the switches being operated at a different frequency when the cam follower means follows one cam surface than when it follows the other, means forming a condition responsive switch in series with the first switch which is closed for longer periods, means controlled by the condition responsive switch for adjusting the cam follower means from one cam surface to the other for causing the said switch means to be operated at a higher frequency when the condition responsive switch is unsatisfied, and manual selector means for rendering the cam follower adjusting means effective or ineffective in response to the condition responsive switch.

5. In apparatus of the character described, in combination, a fuel feeding device, control apparatus for the device comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, the first switch being closed for longer periods than the second and the switches being operated at a different frequency when the cam follower means follows one cam surface than when it follows the other, means forming a condition responsive switch in series with the first switch which is closed for longer periods, means controlled by the condition responsive switch for adjusting the cam follower means from one cam surface to the other for causing the said switch means to be operated at a higher frequency when the condition responsive switch is unsatisfied, and manual selector means whereby the cam follower adjusting means may be rendered effective or ineffective in response to the condition responsive switch and whereby the switch which is closed for longer periods may be shunted so as to cause continuous operation of the fuel feeding device when the condition responsive switch is unsatisfied.

6. In apparatus of the character described, in combination, a fuel feeding device, control apparatus for the device comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, the first switch being closed for longer periods than the second and the switches being operated at a different frequency when the cam follower means follows one cam surface than when it follows the other, means forming a condition responsive switch in series with the first switch which is closed for longer periods, and means controlled by the condition responsive switch for adjusting the cam follower means from one cam surface to the other for causing the said switch means to be operated at a higher frequency when the condition responsive switch is unsatisfied, said cam follower adjusting means comprising a bimetal element and a heater therefor, the heater being energizable by the condition responsive switch.

7. In apparatus of the character described, in combination, a fuel feeding device, control apparatus for the device comprising means forming a first cam surface and a second cam surface, cam follower means adapted to follow one or the other of said surfaces, first and second switch means actuatable by the cam follower means, means for moving the cam surfaces and cam follower means relatively to each other, the cam surfaces, cam follower means and switches being so arranged that the switches are periodically operated, the first switch being closed for longer periods than the second and the switches being operated at a different frequency when the cam follower means follows one cam surface than when it follows the other, means forming a condition responsive switch in series with the first switch which is closed for longer periods, means controlled by the condition responsive switch for adjusting the cam follower means from one cam surface to the other for causing the said switch means to be operated at a higher frequency when the condition responsive switch is unsatisfied, said cam follower adjusting means comprising a bimetal element and a heater therefor, the heater being energizable by the condition responsive switch, and manual selector means whereby said heater may be shunted to render the cam follower adjusting means ineffective and whereby said switch which is closed for longer periods may be shunted so as to cause continuous operation of the fuel feeding device when the condition responsive switch is unsatisfied.

EDWARD C. WALSH.